(12) United States Patent
Moss et al.

(10) Patent No.: US 10,749,987 B2
(45) Date of Patent: Aug. 18, 2020

(54) SYSTEM FOR MANAGING SOFTWARE VERSIONS IN MULTITENANT CLOUD IP VIDEO-TELEPHONY SERVICES

(71) Applicant: StarLeaf Ltd, Greater London (GB)

(72) Inventors: Nicholas Ian Moss, Middlesex (GB); Timothy Joseph Nicolson, Rickmansworth (GB); Phillip Michael Birtwell, London (GB)

(73) Assignee: StarLeaf Ltd, London (GB)

( * ) Notice: Subject to any disclaimer, the term of this patent is extended or adjusted under 35 U.S.C. 154(b) by 36 days.

(21) Appl. No.: 15/703,696

(22) Filed: Sep. 13, 2017

(65) Prior Publication Data

US 2018/0074816 A1 Mar. 15, 2018

(30) Foreign Application Priority Data

Sep. 14, 2016 (GB) .................................. 1615598.8

(51) Int. Cl.
*H04L 29/08* (2006.01)
*H04L 29/06* (2006.01)
(Continued)

(52) U.S. Cl.
CPC ............... *H04L 67/34* (2013.01); *G06F 8/71* (2013.01); *G06F 9/50* (2013.01); *H04L 41/0813* (2013.01);
(Continued)

(58) Field of Classification Search
CPC ......... G06F 8/71; G06F 9/50; H04L 45/3065; H04L 45/563; H04L 45/42; H04L 45/306;
(Continued)

(56) References Cited

U.S. PATENT DOCUMENTS 7,383,541 B1 * 6/2008 Banks .................. G06F 8/65
717/126
2010/0131656 A1 5/2010 Tysm
(Continued)

FOREIGN PATENT DOCUMENTS

EP 2242243 A2 10/2010
WO 2016/082870 A1 6/2016

OTHER PUBLICATIONS

Combined Search and Examination Report under Sections 17 & 18(3) dated Feb. 23, 2017 for Application No. GB1615598.8, 8 pages.

*Primary Examiner* — Joshua Kading
(74) *Attorney, Agent, or Firm* — Knobbe, Martens, Olson & Bear, LLP (57) ABSTRACT

Disclosed embodiments relate to a shared computing system for use in telecommunications between end-point telecommunication devices comprising a plurality of instances of a telecommunications service component and a version control gateway configured to route a communication connection from an end-point telecommunication device to an appropriate instance, of the plurality of instances, of the service component. In some embodiments, different end-point telecommunication devices may use different instances of the service component. Some embodiments relate to a network for telecommunications between end-point telecommunication devices, a version control gateway for use in the system of the disclosure, a method of providing a telecommunications service to a user, a method of migrating a user from one software version of a telecommunications service to another, and computer programs and computer-readable media.

18 Claims, 3 Drawing Sheets

(51) Int. Cl.
*G06F 8/71* (2018.01)
*H04L 12/24* (2006.01)
*H04L 12/771* (2013.01)
*H04L 12/725* (2013.01)
*G06F 9/50* (2006.01)
*H04L 12/717* (2013.01)
*H04M 3/56* (2006.01)
*H04M 7/00* (2006.01)

(52) U.S. Cl.
CPC ........ *H04L 45/3065* (2013.01); *H04L 45/563* (2013.01); *H04L 65/102* (2013.01); *H04L 65/403* (2013.01); *H04L 67/148* (2013.01); H04L 29/0827 (2013.01); H04L 45/42 (2013.01); H04L 65/1006 (2013.01); H04L 65/1009 (2013.01); H04L 65/1046 (2013.01); H04M 3/567 (2013.01); H04M 7/0081 (2013.01)

(58) Field of Classification Search
CPC ... H04L 45/308; H04L 45/58; H04L 41/0813; H04L 65/102; H04L 65/403; H04L 65/1009; H04L 65/1006; H04L 67/148; H04L 67/34; H04L 29/0827; H04M 7/0081; H04M 3/567
See application file for complete search history.

(56) References Cited

U.S. PATENT DOCUMENTS

| | | |
|---|---|---|
| 2010/0265938 A1 | 10/2010 | Fullarton et al. |
| 2011/0255675 A1 | 10/2011 | Jasper et al. |
| 2014/0208295 A1* | 7/2014 | Yang ........................ G06F 8/70 717/120 |
| 2014/0379901 A1 | 12/2014 | Tseitlin et al. |
| 2016/0092208 A1 | 3/2016 | Nicol et al. |
| 2017/0083354 A1* | 3/2017 | Thomas ................ G06F 9/4881 |
| 2017/0111476 A1* | 4/2017 | Saheba ................... H04L 67/42 |

* cited by examiner

SYSTEM FOR MANAGING SOFTWARE VERSIONS IN MULTITENANT CLOUD IP VIDEO-TELEPHONY SERVICES

CROSS-REFERENCE TO RELATED APPLICATIONS

This application claims the benefit of Great Britain Patent Application No. 1615598.8, filed on Sep. 14, 2016, which is hereby incorporated by reference in its entirety.

FIELD OF THE DISCLOSURE

The present disclosure relates generally to telecommunications between end-point telecommunication devices. More particularly, embodiments of the disclosure relate to the management of software for end-users of a multitenant telecommunications service.

BACKGROUND OF THE DISCLOSURE

Inter-site conferencing is an integral part of many businesses today. Consequently, the capacity for inter-site interaction by exchanging data streams through a shared network such as the public Internet is assuming an increased importance for many companies, both large and small. Many if not most organisations will have systems of some description in place to enable their members to interact not only with other employees operating from different sites, but also with clients and other individuals external to the organisation.

Conventionally, voice conferencing is realised through the use of Voice over Internet Protocol (VoIP) telephony systems, installed and maintained independently by individual organisations and their IT teams. Consequently, where a new or updated version of any of the call control or media handling software currently running on those systems is released, that updated edition can be fully tested against all the types of telephony devices and other hardware in place within the organisation. To minimise disruption, such testing can be done out of hours, or using spare equipment. Testing new software versions in this way can prevent or reduce potential interruptions to users of the conferencing service by allowing any incompatibilities or other teething problems to be resolved prior to commencing live use of the new software.

Figure 1:
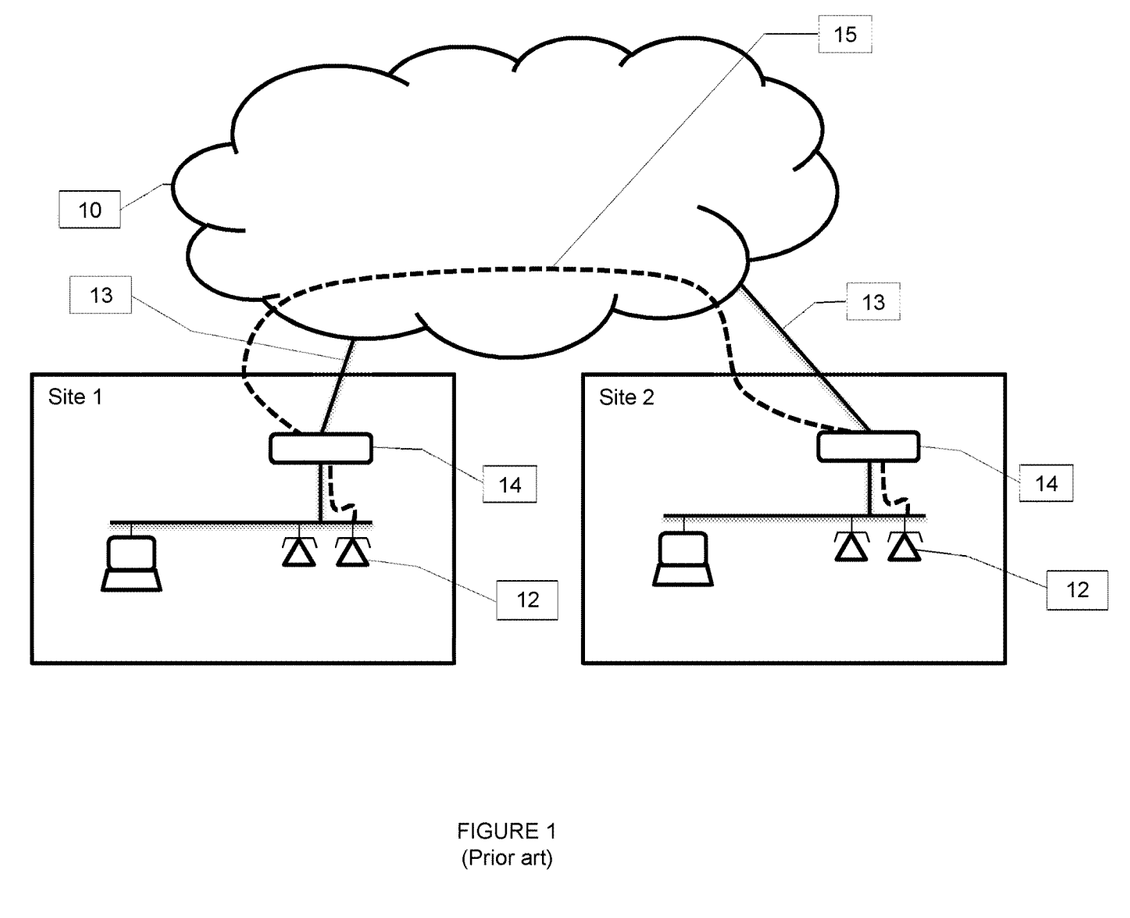
FIG. 1 is a schematic diagram of a known inter-site conferencing arrangement according to the prior art.

However, end-users are steadily becoming more demanding in terms of the functionality required of inter-site communications systems, and there is an increasing desire for additional services such as video conferencing. Currently, video telephony also commonly takes place over the public Internet. FIG. 1 shows, schematically, an exemplary prior art network that may be used to implement video IP telephony between physically separate sites.

In the drawing of FIG. 1, a network includes two end-user computing systems, each at a different physical site and each connected to the public Internet 10 by a link 13. In this example, the two sites belong to two independent organisations, the members of which may wish to communicate with one another. However, the telecommunications illustrated may alternatively be between separate sites belonging to one organisation.

The computing system at each site includes a local video server 14, connected to individual video end-systems 12. When a call is initiated from one site to another, a connection is set up between the two servers 14 through the Internet 10, as shown by the dashed line 15.

In the example network of FIG. 1, the software and/or firmware for the devices of the two sites are independent, and communication between the two end-systems is based on standard protocols agreed and published by international standards organisations for interoperability between equipment from different vendors so as to ensure compatibility and smooth communications.

In spite of this, the potential still exists for incompatibilities between the call handling software running at each site. In part, this is due to the complexity and wide feature set of video IP telephony, which are considerably greater than those of VoIP telephony. Associated with that complexity is a correspondingly increased risk of incompatible interactions between equipment, which is typically evident when software is upgraded locally to one individual site. For example, a new version of a video encoder in a sending end-system may implement a new video encoding feature that a receiving end-system may not be equipped to handle. This can cause the receiving system, which may previously have worked reliably, to fail.

In parallel with the growing popularity of video IP telephony within organisations, traditional IP telephony has seen a move in many cases to migrate call control away from individual organisations to multi-tenant, 'cloud-based' services that exist to handle call routing to the public switched telephone networks. Since voice services are comparatively simple, this approach can work well in the case of inter-site voice telephony: the risk of unexpected incompatibilities that could arise following a software upgrade somewhere within the multi-tenant cloud infrastructure is comparatively small. Furthermore, the feature set of such services is typically simple (in practice, what is required is often simply the routing of calls between end-users and the public switched telephone network, and between end-users at different sites), so that in the unlikely event of an incompatibility a roll-back to a previous version of the service's software infrastructure is straightforward to implement and often has little or no significant impact on end-user experience.

(The term 'cloud' is used throughout this document to refer to any centralised, distributed or shared computing arrangement. Cloud resources are typically geographically separate from end-user systems, are shared by multiple users and are dynamically re-allocated per demand With cloud technology, those multiple users can access a single server (which may be distributed over a number of processing units), to retrieve and update their data.)

Figure 2:
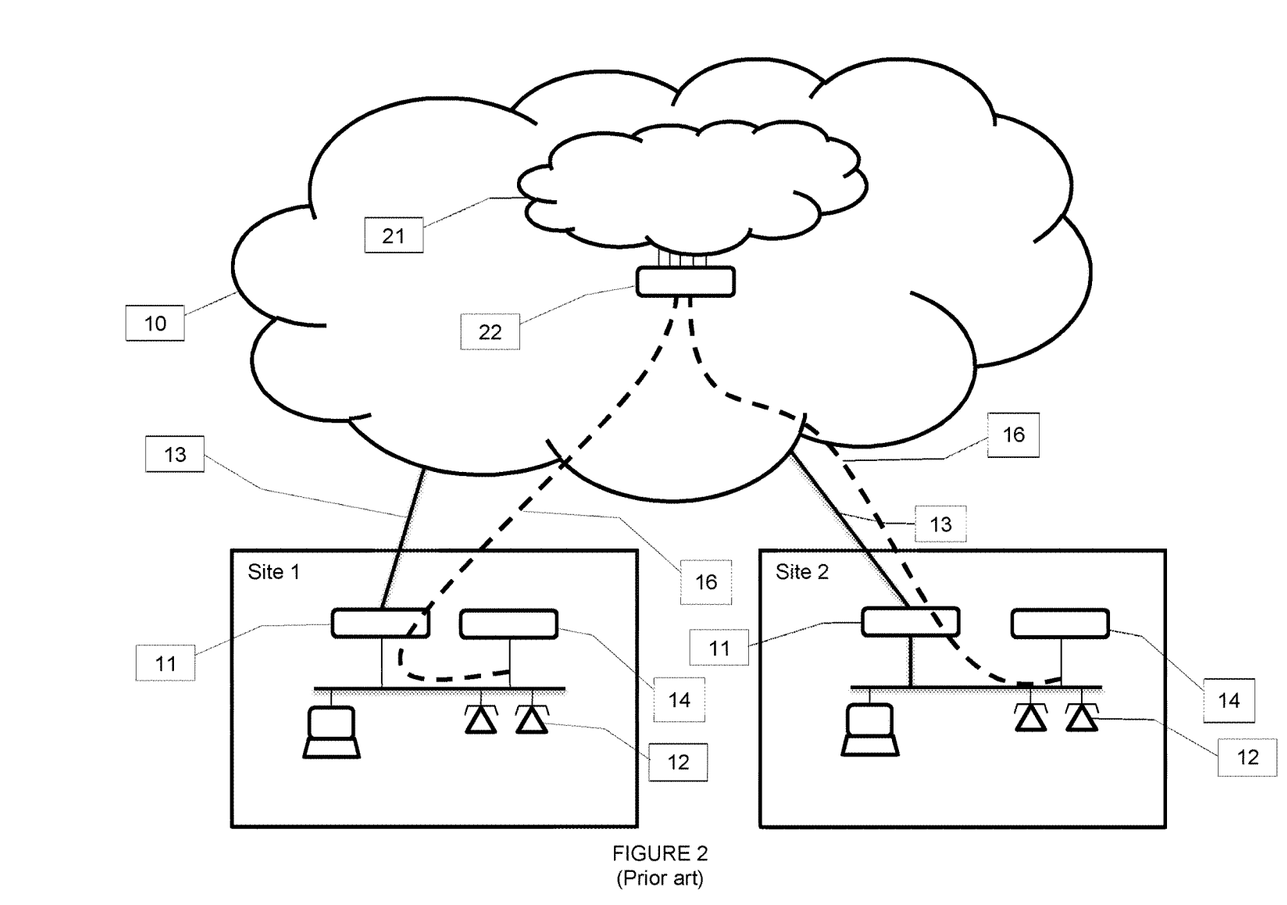
FIG. 2 is a schematic diagram of a known inter-site conferencing arrangement managed by a cloud-based service according to the prior art.

The interplay of these two trends—the growing feature set of video telephony and its complexity with respect to more traditional systems; and the outsourcing of voice telephony control—has led to the emergence of state-of-the-art cloud-based outsourced multi-tenanted video telephony services, such as the one shown in overview in FIG. 2, which many organisations are growing to expect.

FIG. 2 shows, schematically, a network implementing a cloud-based video telephony service. Similarly to the network of FIG. 1, two local end-user computing systems are each connected to the Internet 10 by a respective link 13, and include local video end-systems 12. However, differently from the network of FIG. 1 those systems communicate not directly with each other, but via a cloud-based video network 21 on the Internet 10. Each end-system 12 connects to services hosted on the cloud through a router 11 and a cloud-based session border controller (also referred to herein simply as a 'border controller') 22, configured to control the signalling between individual sites. End-systems 12 may again make use of an on-site communications server 14 similar to that of FIG. 1, which can simplify the configuration of inter-site connection.

This move towards setups of the kind shown in FIG. 2 introduces new software logistics challenges. As mentioned, video conferencing services often offer feature sets that are far more complex than those of more traditional systems, and can in some cases include still further functionality such as screen sharing and instant messaging. Additionally, the proper handling of video streams over the Internet is complex; the types of video end-systems on offer are diverse and numerous; and multiple organisations having unpredictable and potentially inconsistent configurations may be served by one, same central infrastructure.

These factors all contribute to logistical difficulties in managing software updates within the cloud infrastructure 21, which take on a significant incompatibility risk as compared with legacy environments. In the worst case scenario, an update to the software responsible for the provision of the centralised service may introduce a feature that is demanded by one organisation attached to the outsourced service provider, but is incompatible with one or more mission critical devices of another. In other words, the new feature may be required by one end-user, while another may demand that it is withheld in order for its business to run without interruption.

A second, related problem with which the disclosure is concerned is the logistical challenge presented by the software migration process itself—even when potential incompatibilities are discounted. Traditionally, implementation of a software upgrade to a cloud-based telecommunications service follows one of two general procedures prevailing in the art.

One, presently preferred option is to install the new cloud service software fully on spare physical resources, equivalent to the hardware on which the current version is running, before shutting down the network to enable the configuration database to be updated. Once this is done, service may be resumed.

However, one major drawback of this approach is the investment of resources required: to achieve deployment of every component of the new software version before the switchover commences, all system hardware must be replicated. It will be appreciated that the associated financial cost, as well as the time and the degree of human resources involved, can quickly become prohibitive, in particular in view of the scale of some of the networks existing today.

It is possible to achieve software migration without this investment in duplicate physical resources. However, the only alternative existing today requires the entire video network—including the cloud-based infrastructure itself, as well as all end-systems connected to it—to be shut down for extended periods of time. This gives space for all software components on all systems to be upgraded, and the configuration database updated as appropriate, before service is resumed.

As will be appreciated, however, the required downtime can be extensive and this approach can cause considerable inconvenience to end-users. Furthermore, the interruption of service to all end-users must be synchronised, and the service resumed for each of them only once the migration process is complete across the network. Where the video network is a shared cloud architecture to which hundreds or even thousands of clients are attached, this level of coordination is not always possible and is, at best, extremely challenging.

Thus, there is a need for improved systems and methods for managing updates to the software used to provide cloud-based video telephony services.

SUMMARY

Embodiments of the disclosure address the software logistics challenges described above by providing methods and systems for running multiple versions of a cloud-based IP telephony call control service software infrastructure. Incoming connections from end-users attached to the service are then directed between those versions as appropriate.

The present disclosure is defined in the independent claims, to which reference should be made. Additional features are set out in the dependent claims.

According to one aspect. some embodiments provide a shared computing system for use in telecommunications between end-point telecommunication devices. The shared (or, equivalently, cloud) computing system includes a plurality of instances of a telecommunications service component, and a version control gateway for routing incoming communication connections from an end-point telecommunications device to the appropriate one of those instances of the service component. Some embodiments provide a network for telecommunications between end-point telecommunication devices, comprising a system in accordance with the first aspect together with one or more end-point telecommunication devices.

According to some embodiments, there is provided a version control gateway for use in a shared computing system for telecommunications between end-point telecommunication devices. The gateway is configured to route a communication connection from an end-point telecommunication device to the appropriate one, of a plurality of instances of a telecommunications service component hosted on the shared computing system, for that end-point device.

Some embodiments provide a method of providing a telecommunications service to a user. The method includes the steps of receiving, at a version control gateway within a shared computing system, a communication connection from an end-point telecommunications device of the user; and using the version control gateway to route the connection to an appropriate one of a plurality of instances of a service component of the telecommunications service hosted on the shared computing system.

Thus, embodiments of the disclosure maintain, simultaneously, multiple software versions of an outsourced or centrally hosted telecommunications service. In this way, the centrally hosted service may serve, without conflict, users whose end-point telecommunication systems are not necessarily configured according to the same version of the relevant software. Version control gateways are configured to intercept incoming communication connections from an end-point telecommunications device to the components of the telecommunications service, and to direct the connections to the instance of the desired service component that is best suited to that device. In some embodiments, incoming connections are routed to the instance of the component with which the software of the calling device is most compatible.

Cloud telephony services and methods in accordance with some embodiments may allow the service host to provide state-of-the-art services to those customers having end-point devices capable of receiving and handling those services, without sacrificing the provision of service, or the level of any service provided, to customers whose devices are not (or are not yet) compatible with the latest software or features.

It follows that communication between end-users at different sites running otherwise incompatible versions of the telephony software, which has previously been difficult or even unfeasible, may also be made possible or more straightforward.

Additionally, embodiments of the disclosure may provide for the migration of individual customers between various versions of software corresponding to a telecommunications service in an independent fashion. That is, an organisation served by a central telecommunications service in accordance with the embodiments of the disclosure may upgrade (or downgrade) its telephony software in a straightforward and easy way which, furthermore, neither depends upon nor influences any similar changes by other customers.

Accordingly, some embodiments of the disclosure further provide a method of migrating a user of a telecommunications service from one software version of the telecommunications service to another. This migration may correspond either to an upgrade or to a downgrade, but in both cases includes the steps of creating component instances of the second software version of the service; suspending telecommunication to and from the (or one of the) user's devices; updating configuration data for the user; resuming telecommunication connections to and from the end-point telecommunication device; and destroying component instances of the original software version.

BRIEF DESCRIPTION OF THE DRAWINGS

Embodiments of the disclosure will now be described, by way of enabling example only, with reference to the accompanying drawings in which.

DETAILED DESCRIPTION

An example software management arrangement will now be described with reference to FIG. 3.

Figure 3:
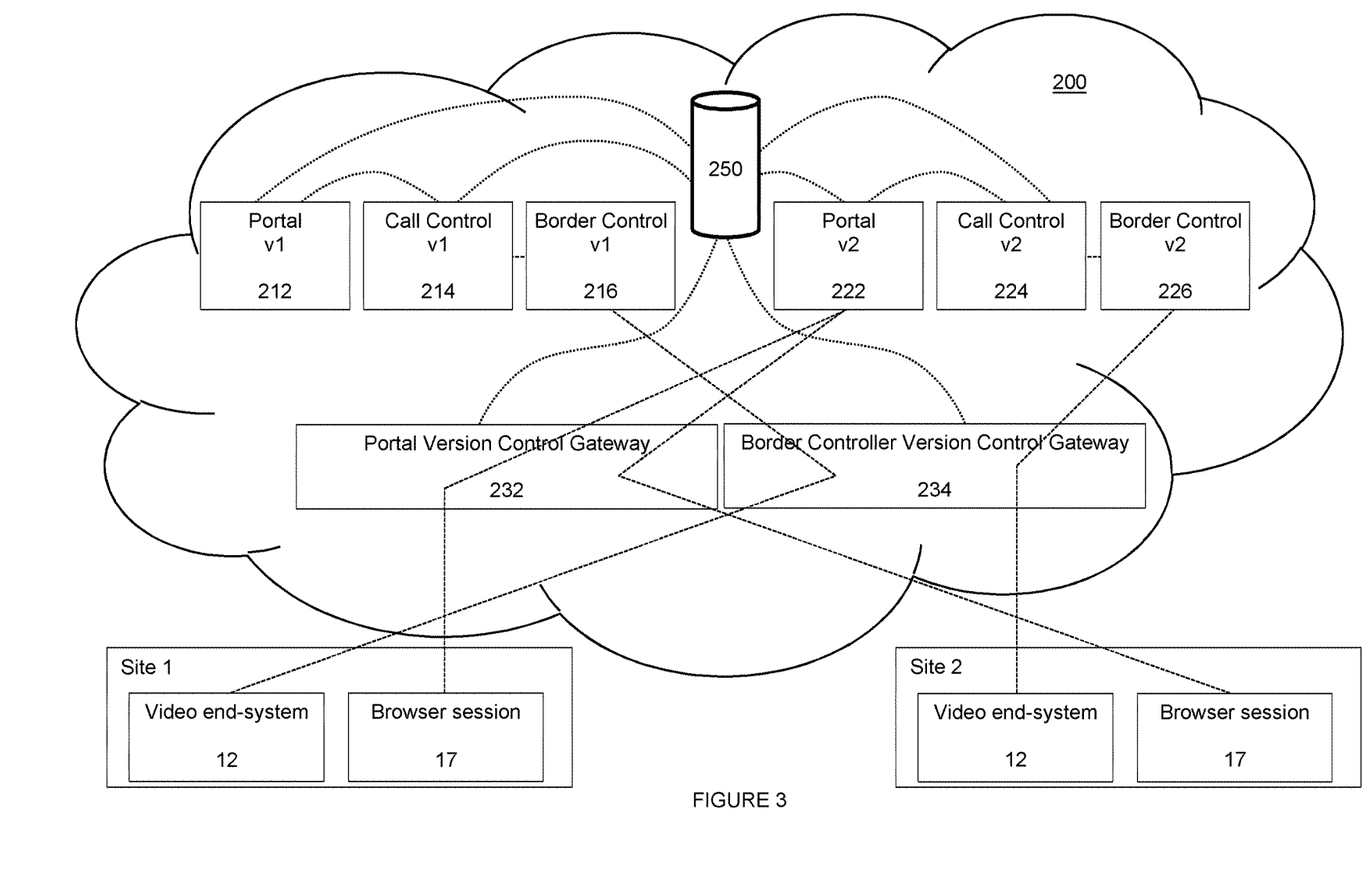
FIG. 3 shows a cloud video telephony network according to some embodiments.

According to some embodiments, FIG. 3 shows a modular cloud video telephony network (at times referred to herein simply as a 'video network') including end-user computing systems at Sites 1 and 2 in operative communication with a cloud call control and software management system 200. As in FIG. 1, the sites in this example may be geographically separate sites within a single organisation; or may alternatively belong to different organisations. In either case, the term 'end-user' is used in this document to refer generally to the collection of individuals associated with a given site and who may require access to the services provided by cloud system 200. Thus, an end-user may be a business or organisation; a sub-set of individuals within an organisation; or even a private individual.

Shown schematically in the drawing of FIG. 3 are a video end-system 12, similar to those of FIGS. 1 and 2, and a user interface 17 at each site. Those familiar with the field will realise that the systems at each site can include many additional components and functionalities, omitted here for simplicity of exposition.

In this example, the service provided by cloud system 200 includes the following three components:

1. A Web Management Portal to which an end-user may connect a browser 17 in order to manage the cloud video network services. For example, an organisation may connect to the Web Management Portal in order to configure individual users, devices and/or permissions related to the video telephony service provided. The Web Management Portal may also include per-user portal pages, for managing voicemail and personal preferences, for instance.
2. A Web Communications or Call Control Portal, to which a user may connect using browser 17 in order to access web-based communications applications, such as a Real-Time Communications client.
3. A Border Controller, to which an individual hardware device such as an H.323 or SIP end-point, or a customer site gateway, may connect in order to access cloud video network services.

By 'service component' is meant the location on the Internet to which an end-user's device or program should attempt to connect in order to access the corresponding service. In practice, each of the components just described can comprise of hardware and software resources.

Some embodiments of the disclosure run multiple instances of each service component in parallel, each configured according to a different version of the corresponding software. Thus, in the example system 200 of FIG. 3, component instances 214 and 224 are both Web Communications Portals, but run different versions of the relevant programs and other coding. In one example, the software running on Web Communications Portal 224 may be an upgraded version of that running on Web Communications Portal 214, and may include support for an additional hot-desking feature that is not included in the 'original' software version of Portal 214, for instance. As a further example, two versions of a media management service may be offered, to support slightly differing video encodings for example. Similarly, different editions of the system's web management services are provided by Web Management Portals 212 and 222; and Border Controllers 216 and 226 operate according to different versions of the relevant call signalling management programs.

These software resources of some embodiments of the disclosure may be realised using virtual servers of the sort known in the art, in which a general purpose computer is configured to allow multiple instances of an operating system to operate on the same hardware. Alternatively, certain embodiments of the disclosure may employ a Digital Signal Processor (DSP) farm, again of the known kind, with different DSPs made to run different versions of firmware. Thus, the components 212 to 226 can at times be referred to herein as 'virtual services'.

Those of skill in the art will readily appreciate that other embodiments may include three or more versions of each service component provided; and that the number of instances of each component need furthermore not necessarily be the same.

The interaction of end-users with the various service components just described is overseen by (in this example, two) Version Control Gateways (VCGs) 232 and 234, as will be described below.

All of the communications described and mentioned herein may be dictated by standard protocols, as in FIG. 1, or may instead follow a proprietary protocol designed for the present purpose. The behaviour of the Gateways and of all other cloud components is determined by the contents of a central database 250. In particular, FIG. 3 shows that the web management portals 212 and 222 and the call control portals 214 and 224 communicate bidirectionally with database 250 as part of their normal functioning. For example, the web management portals in some embodiments include a configuration interface, which requires access to the database to make any required changes (such as assigning directory numbers to particular users, for instance). In directing an incoming call, call control portals be required to interrogate the database to match the dialled extension number with a physical endpoint, before a message can be sent to that endpoint to tell it to ring.

As illustrated schematically in the drawing of FIG. 3, the job of the VCGs is to intercept incoming connections from attached end-point systems, and to direct those connections to the appropriate instance of the required service. Thus, in the network of FIG. 3 the Gateways are located in front of the service components 212 to 226, so that all communications between end-systems and cloud services pass through one or the other of them. More specifically, communications with the Web Management and Web Communications Portals pass through the Portal VCG 52; and communications with the Border Controller service pass through Border Controller VCG 54. Other embodiments of the systems, including further and/or different service components, may accordingly include further and/or different Gateways as appropriate.

In some embodiments, each of the VGCs 232 and 234 is realised as a redirector or tunneller, configured to allow systems attaching to the cloud system 200 to connect to the suitable version of the required service: that is, to the version of the service that is appropriate for the organisation to which the attaching user or device belongs. Thus, in the example network shown in FIG. 3, the video end-system 12 of Site 1 is directed, by Border Controller VCG 234, to connect to the Border Controller 216, while the corresponding system of the second Site is directed to Border Controller 224, which may implement a more appropriate version of the session border control software for that site. Conversely, Portal VCG may determine that the same virtual Web Management Portal, 222, is better suited to both Sites than is the alternative version 212.

According to embodiments of the disclosure, the VCGs are implemented using computers running appropriate software, including a redirector layer and/or a tunnelling layer. Where a redirector layer is implemented, the VCG may operate by instructing the attaching device to disconnect and to reconnect to the appropriate service instance to handle the connection, and including direction to the suitable virtual device. Conversely, a tunnelling layer is configured to set up a forwarding connection to pass data from the end-point device to the appropriate virtual service device.

However the VCGs are implemented, incoming connections from end-systems 12 and 17 can be handled in the following manner.
1. Identify the connecting user or device. The manner in which this is done can depend on the protocol with which the user or device is attaching but may, for example, be to make use of the IP address of the connecting device. Alternatively, the individual user may be identified through his or her connection credentials, such as a user account ID.
2. Consult database 250, using the identified information, to determine the organisation to which the attaching user or device belongs.
3. Consult database 250 once more to determine which software version the organisation identified at step 2. is currently running
4. Determine (for example, by looking up) which of the virtual services included in cloud system 200 make up the end-user's organisation's software version; and, more particularly, the virtual device or devices that should handle the service relevant to the attaching protocol.

For example, where a device attaching with H.323 is determined to belong to an organisation running the 'second' of the system 200's two versions of border control software, this step may identify the Border Controller instance 226 as the appropriate virtual device.
5. Provided the attaching protocol is one that includes redirection capability (such as hypertext transfer protocol or HTTP), redirect the connecting device to the identified instance of service; that is, to the component instance that implements the service version expected by the end-user.
6. If the protocol does not include the capability of a redirection (as H.323 does not, for instance), then act as a forwarder to tunnel the connection to the appropriate instance of service that implements the service version expected by the end-user.

Thus, some embodiments of the disclosure provide cloud-based call control systems and services able to serve, reliably, all end-users attaching to the service, whether or not those end-users are running or expecting the same version of the telephony software. In this way, certain embodiments may ease the conflict between the general need to keep cloud telephony services up-to-date with state-of-the-art software, and the concern that to do so can preclude one or more existing customer's continued use of the service due to incompatibilities. Furthermore, communication between end-users at different sites may be made possible independently of whether those end-users are running the same or even compatible versions of the call control software.

Following the introduction of multiplexing layers 232, 234 in front of multiple, parallel versions of the service software for system 200, as described above, embodiments of the disclosure may allow the migration of individual end-users from one of those versions to another, independently of any other users attached to the service. The migration path is similar whether the end-user is being upgraded or downgraded, and a typical sequence in a situation in which users' software is maintained centrally as part of the cloud service, may be as follows.
1. Create and initialise component instances of the new software version on the appropriate hardware platforms of the cloud service 200.
2. Suspend all calls to and from the end-user's system.

This may be done, for example, by putting new incoming calls to the end-user's video network from external sources (for example, from public video gateways or from the public switched telephone network) in a queue; disabling new outbound calls; and waiting for no calls to be in progress.
3. Instruct all cloud service components to disconnect the end-user's system.
4. Run a suitable migration script on the customer database 250 on the cloud system 200 to upgrade (or downgrade) the end-user's configuration data. For instance, returning to the example given above in which a user is upgraded to a new version of call control software that supports an additional hot-desking feature, a new column may be added to the user configuration database table to indicate whether or not hot-desking is permitted. To downgrade the user to the original version, in which hot-desking is not supported, that column should be removed.

5. Instruct all points of presence to allow the user to re-connect.
6. Resume acceptance of incoming calls.
7. Destroy all component instances of old software versions on all applicable hardware platforms.

All of these steps may apply only to a single end-user. Thus, users may experience a bespoke service, with control over the service they receive. In particular, conflicts of the sort described above, in which the provision of a certain feature is essential to one organisation but detrimental to another, may be avoided.

Additionally, should any unforeseen incompatibilities arise following the resumption of service at step 6, steps 2 to 6 may simply be re-run to downgrade the user back to the previous software version pending resolution of those inconsistencies. In particular, the process may incorporate a suitable time delay between steps 6 and 7, leaving space to ensure that a user is satisfied with the new software version before the old is deleted and thus made unavailable.

Furthermore, the ability to migrate one end-user at a time may allow for the efficient use of physical resources. During a migration itself, a doubling of the physical resources allocated to a given end-user is required, since the organisation is running live on one set of software components, implemented on one set of physical hardware, while additional hardware resources are required to bring up the new software version and the new video processing resources ready for the switchover. However, this requirement is limited in scope and limited in time: after the organisation has been successfully migrated to the new software version, operating on the duplicate hardware, the original resources are no longer needed by that end-user and so can be de-allocated and used, for example, for the next migration. This is in contrast to the existing need to double the entire physical resources of the cloud system in order to achieve cutover without subjecting end-users to extended periods of service interruption, as described above.

While the present call control systems and methods have been described against a background need for improved outsourced video telephony services, it will be appreciated that the disclosure is not limited to use in that context. In some embodiments, the approaches described herein may find equal application to the more simple case of voice conferencing, or extension to services featuring screen sharing, instant messaging and other conferencing features known in the art. The scope of the present disclosure is defined and determined solely by the appended claims. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A shared computing system for use in telecommunications between end-point telecommunication devices, the shared computing system comprising:
a plurality of instances of a telecommunications service component stored in a memory; and
a version control gateway comprising one or more processors configured to:
identify an end-point telecommunication device of the end-point telecommunication devices;
identify an appropriate instance of the plurality of instances of the telecommunications service component, wherein identifying the appropriate instance comprises identifying an instance of the telecommunication service component including a software version compatible with the end-point telecommunication device, wherein the version control gateway, the end-point telecommunication devices, and the telecommunication service component are separate devices; and
route a communication connection from the end-point telecommunication device to the appropriate instance of the plurality of instances of the telecommunications service component such that different end-point telecommunication devices are configured to use different instances of the telecommunications service component,
wherein the appropriate instance corresponds to an organisation with which an attaching end-point telecommunication device is associated, and
wherein the plurality of instances of the telecommunications service component comprise different versions of software corresponding to the telecommunications service component.

2. The shared computing system according to claim 1, wherein the version control gateway is further configured to appear in front of the instances of the telecommunications service component.

3. The shared computing system according to claim 1, wherein the version control gateway comprises a redirector.

4. The shared computing system according to claim 1, wherein the version control gateway comprises tunneling channels.

5. The shared computing system according to claim 1, wherein the version control gateway is further configured to:
receive a communication connection from the end-point telecommunication device;
identify an organisation to which the end-point telecommunication device is associated; and
based on the identification of the organisation, determine the appropriate instance of the telecommunications service component for the end-point telecommunication device.

6. The shared computing system according to claim 1, wherein the plurality of instances of the telecommunications service component comprise a virtual server.

7. The shared computing system according to claim 1, wherein the telecommunications service component comprises a web management portal for telecommunications service management, a web communications portal for web-based communications and/or a border controller for telecommunication session border control.

8. A network for telecommunications between end-point telecommunication devices, the network comprising:
a plurality of end-point telecommunication devices; and
a shared computing system according to claim 1, the version control gateway configured to route a communication connection from each of the end-point telecommunication devices of the network to the appropriate instance of the plurality of instances of a telecommunications service component such that the end-point telecommunication devices are configured to use different instances of the telecommunications service component,
wherein the appropriate instance of the plurality of instances of a telecommunications service component corresponds to an organisation with which an attaching end-point telecommunication device is associated.

9. A version control gateway comprising one or more processors for use in a shared computing system for telecommunications between end-point telecommunication devices, the one or more processors of the version control gateway configured to:
   identify an end-point telecommunication device of the end-point telecommunication devices;
   identify an appropriate instance of a plurality of instances, wherein identifying the appropriate instance comprises identifying an instance of thea telecommunication service component including a software version compatible with the end-point telecommunication device, wherein the version control gateway, the end-point telecommunication devices, and the telecommunication service component are separate devices; and
   route a communication connection from the end-point telecommunication device to the appropriate instance, of a plurality of instances in the shared computing system, of a telecommunications service component, wherein the appropriate instance corresponds to an organisation with which an attaching end-point telecommunication device is associated.

10. The version control gateway according to claim 9, wherein the one or more processors are further configured to appear in front of the instances of the telecommunications service component.

11. The version control gateway according to claim 9, further comprising a redirector.

12. The version control gateway according to claim 9, further comprising tunneling channels.

13. The version control gateway according to claim 9, wherein the one or more processors are further configured to:
   receive a communication connection from the end-point telecommunication device;
   identify an organisation with which the end-point telecommunication device is associated; and
   based on the identification of the organisation, determine the appropriate instance of the telecommunications service component for the end-point telecommunication device.

14. A method of providing a telecommunications service to a user, the method comprising:
   receiving, at a version control gateway within a shared computing system, a communication connection from an end-point telecommunication device of the user;
   identifying the end-point telecommunication device;
   identifying an appropriate instance of a plurality of instances of a telecommunications service component hosted on the shared computing system, wherein identifying the appropriate instance comprises identifying an instance of the telecommunication service component including a software version compatible with the end-point telecommunication device, wherein the version control gateway, the end-point telecommunication device, and the telecommunication service component are separate devices; and
   routing, using the version control gateway, the communication connection to the appropriate instance of the plurality of instances of the telecommunications service component,
   wherein the appropriate instance corresponds to an organisation with which an attaching end-point telecommunication device is associated, and
   wherein the plurality of instances of the telecommunications service component comprise different versions of software corresponding to the telecommunications service component.

15. The method according to claim 14, further comprising:
   receiving a communication connection from the end-point telecommunication device;
   identifying an organisation to which the end-point telecommunication device is associated; and
   based on the identification of the organisation, determining the appropriate instance of the telecommunications service component for the end-point telecommunication device.

16. The method according to claim 14, wherein the telecommunications service component comprises a web management portal for telecommunications service management, a web communications portal for web-based communications and/or a border controller for telecommunication session border control.

17. A non-transitory computer-readable medium storing a computer program for carrying out the method of claim 14.

18. A non-transitory computer-readable medium comprising instructions for carrying out the method of claim 14.

* * * * *